United States Patent [19]

van der Lely

[11] 4,114,695

[45] Sep. 19, 1978

[54] ROTARY HARROW WITH PIVOTABLE COUPLING ASSEMBLY

[75] Inventor: Ary van der Lely, Maasland, Netherlands

[73] Assignee: C. van der Lely N.V., Maasland, Netherlands

[21] Appl. No.: 719,279

[22] Filed: Aug. 31, 1976

[30] Foreign Application Priority Data

Sep. 2, 1975 [NL] Netherlands .................... 7510308

[51] Int. Cl.² ................ A01B 49/06; A01B 33/06
[52] U.S. Cl. ........................... 172/47; 172/59;
     172/71; 172/443; 172/446; 172/619; 172/679
[58] Field of Search .............. 172/59, 71, 72, 439,
     172/446, 448, 488, 617, 619, 624, 627, 657, 677,
     678, 679, 680, 47, 443; 280/456 A, 460 A, 461 A, 482

[56] References Cited

U.S. PATENT DOCUMENTS

| | | | |
|---|---|---|---|
| 1,436,595 | 11/1922 | McKay | 280/482 |
| 1,654,939 | 1/1928 | Loebs | 280/482 |
| 2,775,180 | 12/1956 | Du Shane | 172/448 X |
| 3,085,634 | 4/1963 | Hotchkiss, Jr. | 172/677 X |
| 3,385,610 | 5/1968 | Vezina | 280/482 |
| 3,643,976 | 2/1972 | Ha upt et al. | 172/439 X |
| 3,774,694 | 11/1973 | Gates | 172/617 |
| 3,937,460 | 2/1976 | van der Lely | 172/59 |
| 3,983,943 | 10/1976 | van der Lely | 172/71 X |
| 4,018,170 | 4/1977 | van der Lely | 172/59 X |

FOREIGN PATENT DOCUMENTS

| | | | |
|---|---|---|---|
| 202,798 | 8/1956 | Australia | 280/456 A |
| 1,430,128 | 1/1966 | France | 172/439 |
| 2,557,753 | 7/1976 | Fed. Rep. of Germany | 172/71 |

*Primary Examiner*—Richard T. Stouffer
*Attorney, Agent, or Firm*—Mason, Mason & Albright

[57] ABSTRACT

An implement has an elongated frame that extends transverse to the direction of travel and soil-working members rotatably mounted on a portion of the frame that depends from spaced apart, forward and rear frame beams. A coupling assembly having coupling points for auxiliary implements is pivoted to the forward frame beam by two beam members that extend rearwardly and rest on top of the rear frame beam to limit the downward movement of the assembly when the implement is raised. The rear ends of the beam members are connected to a tubular beam and further beams extend rearward from the tubular beam. A transverse beam interconnects the further beams centrally thereof and coupling points such as hooks are adjustably connected to plates that depend from the further beams. A central coupling point is fastened to the transverse beam and the further beams are adjustable to vary the width of the assembly.

15 Claims, 4 Drawing Figures

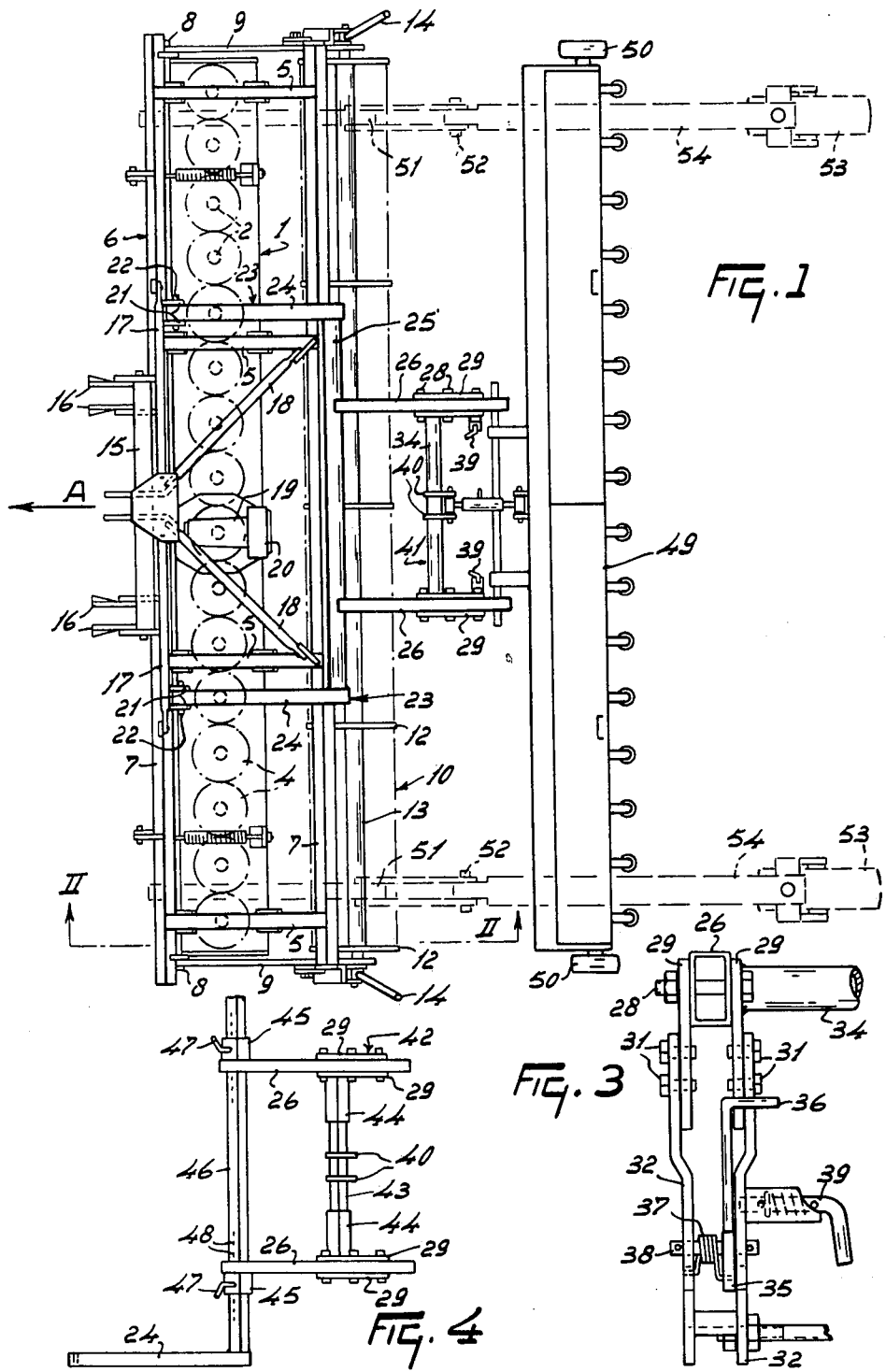

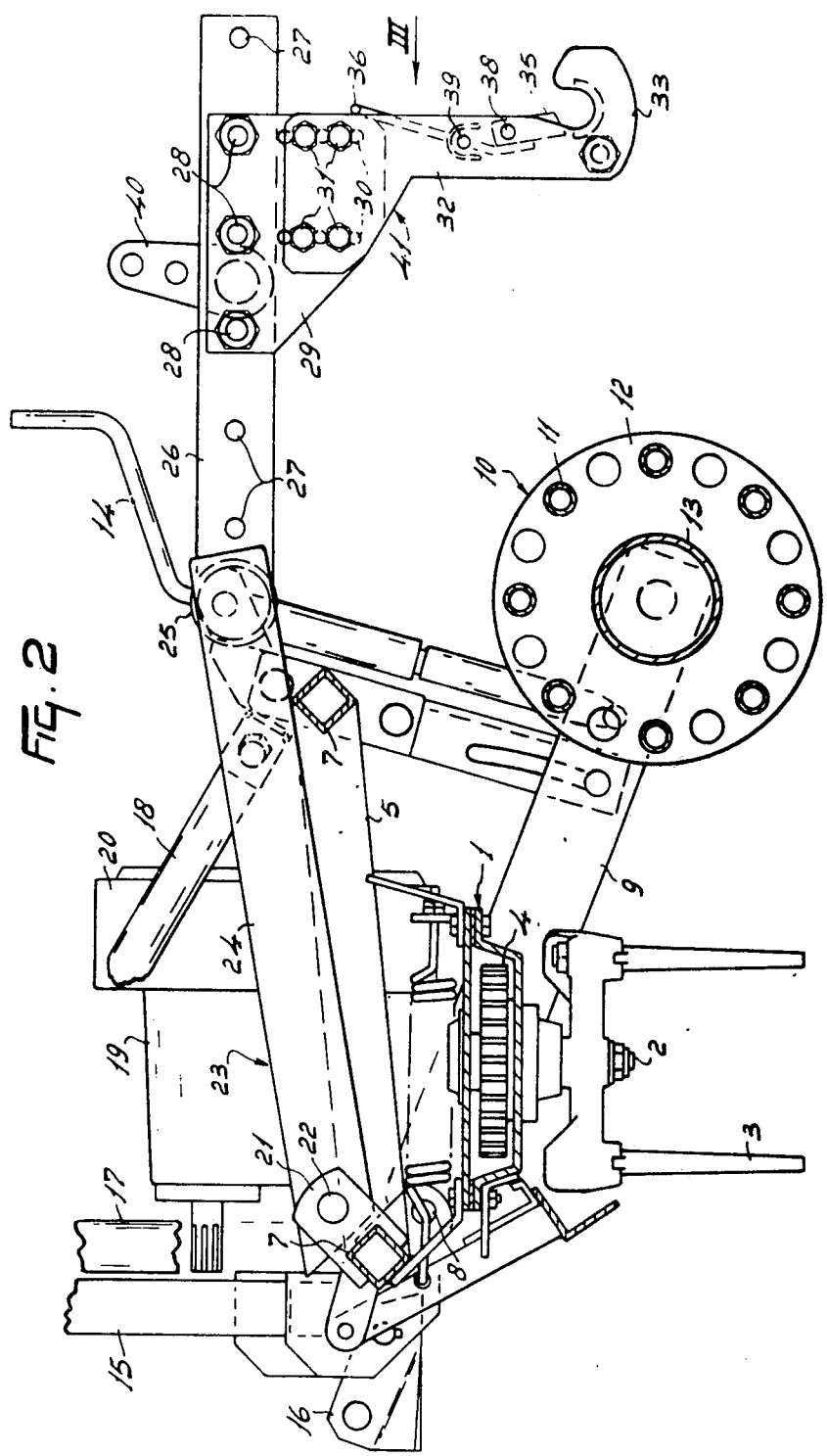

ROTARY HARROW WITH PIVOTABLE COUPLING ASSEMBLY

This invention relates to agricultural implements of the kind which comprise a supporting frame that extends transverse to the intended direction of operative travel of the implement, the rear of said frame with respect to that direction being provided with coupling means to which can be connected at least one further agricultural implement.

According to the invention, there is provided an agricultural implement of the kind set forth, wherein the coupling means comprises a coupling assembly located to the rear of the frame relative to said direction, the coupling means including at least two spaced coupling points, being pivotable about an axis that is at or near the front of the frame relative to said direction, and being limited as to its downward pivotability about that axis by co-operation with a rear member of the supporting frame.

For a better understanding of the invention, and to show how the same may be carried into effect, reference will now be made, by way of example, to the accompanying drawings, in which:

FIG. 1 is a plan view of an agricultural implement in accordance with the invention, in the form of a soil cultivating implement, a seed drill being connected to the rear of the implement, FIG. 2 is a section, to an enlarged scale, taken on the line II—II in FIG. 1, FIG. 3 is an elevation as seen in the direction indicated by an arrow III in FIG. 2, and FIG. 4 is a plan view illustrating an alternative construction for certain of the parts that are illustrated in the embodiment of FIGS. 1 to 3.

Referring to FIGS. 1 to 3 of the accompanying drawings, the agricultural implement that is illustrated therein is a soil cultivating implement which comprises a hollow frame portion 1 that extends substantially horizontally transverse, and usually substantially horizontally perpendicular, to the intended direction of operative travel of the implement that is indicated by an arrow A in FIG. 1. Sixteen substantially vertical, or at least upwardly extending, shafts 2 are rotatably journalled in the hollow frame portion 1 in a single row with the axes of rotation of the shafts 2 spaced apart from one another at regular intervals, such intervals conveniently, but not essentially, having magnitudes of substantially 25 centimeters. The lowermost end of each shaft 2 that projects downwardly from beneath the bottom of the hollow frame portion 1 carries a corresponding soil working or cultivating member (FIG. 2) that is generally indicated by the reference 3. As can be seen in FIG. 2, each member 3 comprises a substantially horizontally disposed tine support having a central hub that is firmly, but releasably, secured to the lowermost end of the corresponding shaft 2, the opposite ends of the support being provided with sleeve-like tine holders in which upper fastening portions of rigid soil working tines are releasably lodged, said tines having soil working portions that project downwardly from the fastening portions towards the ground surface and into that surface when the implement is in use. Each shaft 2 is provided, inside the hollow frame portion 1, with a straight- or spur-toothed pinion 4, the 16 pinions 4 being dimensioned and arranged in such a way that the teeth of each of them are in mesh with those of the neighbouring pinion, or each of the neighbouring pinions, in the single row thereof. Although the soil cultivating implement that is being described by way of example comprises sixteen of the soil working or cultivating members 3, it is emphasised that this number is not mandatory and that a lesser, or greater, number of the members 3 could equally well be provided.

Four beams 5 extend parallel to one another at substantially regularly spaced apart intervals in positions above the hollow frame portion 1, said beams 5 being parallel to the direction A as seen in the plan view of FIG. 1. The beams 5 form parts of a supporting frame that is generally indicated by the reference 6, said supporting frame 6 also including two hollow frame beams 7, both of square cross-section, that extend parallel to the transverse length of the hollow frame portion 1 at horizontal levels above that hollow frame portion 1 and fore and aft thereof, with respect to the direction A, as seen in the plan view of FIG. 1. Brackets which can be seen in FIGS. 1 and 2 of the drawings fixedly connect the hollow frame portion 1 with the overlying supporting frame 6. Lugs carried by the leading frame beam 7 at locations close to the opposite ends thereof are provided with horizontally aligned stub shafts 8 and the leading ends, with respect to the direction A, of two arms 9 are turnably mounted on the corresponding stub shafts 8 so as to be turnable upwardly and downwardly about the axis defined by those stub shafts. The arms 9 project rearwardly, and are inclined downwardly to an adjustable extent, from the stub shafts 8 and their rearmost and lowermost ends have a rotatable supporting member in the form of a ground roller 10 rotatably mounted between them with the aid of substantially horizontally aligned bearings. The roller 10 comprises a central tubular support 13 to which a plurality, such as five, of circular support plates 12 are secured at regular intervals in such a way that two of the support plates 12 are at the opposite ends of the central tubular support 13 while the others are regularly spaced apart between them, the general plane of each plate 12 being substantially parallel to the direction A and to the general planes of the other plates 12. Each plate 12 is formed close to its circumference with a plurality of holes that are regularly spaced apart from one another around the longitudinal axis of the central tubular support 13. In the embodiment illustrated, there are sixteen of the holes close to the periphery of each plate 12 with the centre of each hole spaced angularly from the centres of the two neighbouring holes, about the axis that has just been mentioned, by $22\frac{1}{2}°$. Elongated elements 11 are entered through the peripheral holes in the support plates 12 in such a way that each element 11 is wound helically to a greater or lesser extent about the longitudinal axis of the central tubular support 13. Each element 11 may be of the hollow tubular form that is illustrated in the drawings or may, as an alternative, be of solid rod-like formation. It will be noted from FIG. 2 of the drawings that it is not necessary for each peripheral hole in each plate 12 to have one of the elongated elements 11 entered therethrough, only eight of the elements 11 being provided with the arrangement illustrated with each element 11 entered through every second peripheral hole in each plate 12. A height adjusting assembly 14 extends between each arm 9 and a corresponding bracket that is rigid with the rear frame beam 7 of the supporting frame 6. The assemblies 14 are of a construction which is known per se and which it is therefore not necessary to describe or illustrate in detail, each assembly 14 comprising, at its upper end, a manually rotatable crank that is connected to a screwthreaded spindle in such a way as effectively to increase, or decrease, the length of the assembly 14 concerned upon rotation of the crank handle in the required direction. Each assembly 14 also includes a bolt and an arcuately slotted member (see FIG. 2) arranged so that, after an adjustment has been made, the bolt can be tightened to maintain the newly adjusted height position positively. It will be apparent that the level of the axis of rotation of the roller 10 that is chosen relative to the supporting frame 6 and hollow frame portion 1 is a principal factor in determining the maximum depth of penetration of the tines of the soil working or cultivating members 3 into the soil which is possible during the operation of the implement.

A coupling member or trestle 15 which is of generally triangular configuration when seen in front or rear elevation is fastened to the leading frame beam 7 at a location midway between the opposite ends of that beam. The two horizontally spaced apart lower coupling points of the member or trestle 15 comprise pairs of pivotably mounted strips 16 arranged for pivotal connection to the free ends of the lower lifting links of a three-point lifting device or hitch carried by an agricultural tractor or other operating vehicle. The apex of the coupling member or trestle 15 comprises a further pair of strips arranged for pivotal connection to the free end of the upper adjustable lifting link of the same three-point lifting device or hitch and it will be noted that, for strengthening purposes, two supports 17 diverge outwardly and downwardly away from substantially the apex of the coupling member or trestle 15 to have their lowermost ends secured to the leading frame beam 7 while two further supports 18 diverge downwardly, and rearwardly with respect to the direction A, from substantially the apex of the member or trestle 15 to have their lowermost and rearmost ends secured to lugs that are indirectly connected to rearmost end regions of two of the beams 5, at locations immediately above the rear frame beam 7.

One of the center pair of the sixteen shafts 2 has an upward extension through the top of the hollow frame portion 1 into a gear box 19 that is mounted on top of that frame portion. The gear box 19 has a substantially horizontally disposed input shaft whose leading splined or otherwise keyed end (see FIG. 2) projects forwardly from the front thereof in substantially the direction A. The rotary input shaft drives an underlying parallel shaft (not visible) through the intermediary of a change-speed gear 20 that is mounted at the rear of the gear box 19 with respect to the direction A. It is not necessary to describe the change-speed gear 20 in detail for the purposes of the present invention but, briefly, it comprises interchangeable and/or exchangeable pairs of straight- or spur-toothed pinions that can be mounted on the splined rearmost ends of the two shafts that project into the casing of the change-speed gear to give a desired transmission ratio between those two shafts. The lower substantially horizontal shaft that is not visible in the drawings is in driving connection with the extension of the shaft 2 that is in vertical register with the gear box 19 by way of intermeshing bevel pinions or the like and it will be realised that the transmission ratio that is set in the change-speed gear 20 enables the soil working or cultivating members 3 to be rotated at a corresponding speed without having to alter the initiating speed of rotation that is applied to the rotary input shaft of the gear box 19. The leading splined or otherwise keyed end of the rotary input shaft of the gear box 19 is intended to be placed in driven connection with the power take-off shaft of an agricultural tractor or other vehicle which operates the implement during the use thereof by way of a telescopic transmission shaft (not shown) that is of a construction which is known per se having universal joints at its opposite ends.

A pair of upwardly and rearwardly inclined lugs 21 is secured to the leading frame beam 7 at equal distances from each side of the center of the coupling member or trestle 15 as seen in plan view (FIG. 1). Horizontally aligned pivot pins 22 are mounted between the two lugs 21 of each pair and each pivot pin 22 has the leading end of a corresponding beam 24 turnably mounted thereon between the associated lugs 21. The two beams 24 form parts of a support that is generally indicated by the reference 23 and both of them extend rearwardly over the top of the rear frame beam 7 to locations that are behind that beam with respect to the direction A. The rearmost ends of the two beams 24 are rigidly interconnected by a substantially horizontally disposed tubular beam 25 that is also substantially parallel to the frame beams 7. Two beams 26 that extend parallel to the direction A as seen in plan view have their leading ends secured to the tubular beam 25 at equal distances inwardly from the opposite ends of that tubular beam and it will be seen from FIG. 2 of the drawings that each beam 26 is formed with a row of regularly spaced apart holes 27. Pairs of substantially vertically disposed plates 29 have upper regions that are formed with rows of three holes that are spaced apart from one another by the same distances as are the holes 27 and it will be seen from FIGS. 2 and 3 of the drawings that the pairs of plates 29 can thus be secured to the corresponding beams 26 at any one of a number (such as four) of different positions therealong by employing horizontally disposed bolts 28 entered through the appropriate holes 27 and the registering holes in the upper regions of the plates 29. When mounted in their operative positions, the plates 29 project generally downwardly from beneath the beams 26. Each plate 29 of each of the two pairs thereof is formed, beneath the corresponding beam 26, with two horizontally spaced apart substantially vertically extending rows of holes 30 and pairs of substantially horizontally disposed bolts 31 are provided to co-operate with the holes 30 in securing the upwardly directed limbs of brackets 32 to the relatively remote surfaces of the two plates 29 of each pair. The bottom of each bracket 32 comprises a corresponding hook 33 and it will be realised that the hooks 33 are adjustable to any chosen ones of a number of different positions relative to the beams 26 by causing the bolts 28 to co-operate with appropriate holes 27 and the bolts 31 to co-operate with appropriate holes 30. The upper regions of the inner plates 29 of the two pairs thereof are rigidly interconnected by a tubular beam 34 that extends parallel to the beam 25 and thus transverse to the direction A.

Each of the two hooks 33 is provided with a corresponding spring-loaded retaining member or bolt 35 which is normally so disposed that it will retain a coupling element of appropriate size between the limbs of the hook 33 concerned. However, each retaining member or bolt 35 is provided with an upwardly directed control arm 36 (FIGS. 2 and 3) which can be turned manually, against the action of a coil spring 37, to bring the member or bolt 35 concerned to an inoperative position in which it will be ineffective. To this end, each arm 36 is turnable about a corresponding pivot pin 38 around which the corresponding coil spring 37 is also wound. One limb of each bracket 32 also carries a corresponding spring-loaded locking pin 39 which can be arranged so that its tip will prevent the associated arm 36 from returning to its normal position, the locking pin 39 thus maintaining the retaining member or bolt 35 concerned in its inoperative position until it is released.

The center of the tubular beam 34 that interconnects two of the plates 29 is provided with a pair of upwardly directed lugs 40 that are spaced apart from one another by a short horizontal distance. Each lug 40 has a pair of holes (see FIG. 2) and either the upper two holes in the two lugs, or the lower two holes therein, can be employed for the pivotal connection thereto of the adjustable upper lifting link of a three-point coupling member. The brackets 32 and their hooks 33, together with the tubular beam 34 and its coupling lugs 40, afford parts of a coupling assembly that is generally indicated by the reference 41, said assembly 41 thus comprising two horizontally spaced coupling points (the two hooks 33) and being turnable upwardly and downwardly about a horizontal axis (afforded by the pivot pins 22) that extends transverse to the direction A and that is located at or near the front of the supporting frame 6 with respect to that direction A. It will be apparent from what has been stated above in respect of the hooks 33 that the coupling assembly 41 can be displaced either forwardly towards the tubular beam 25, or rearwardly away therefrom, by causing the bolts 28 to co-operate with appropriate holes 27 and that its lower coupling points, that are afforded by the hooks 33, can also be raised and lowered relative to the upper coupling point that is afforded by the lugs 40 by causing the bolts 31 to co-operate with appropriate holes 30.

FIG. 4 of the drawings illustrates a modified embodiment in which a beam 43 of square cross-section replaces the tubular beam 34 of circular cross-section. The opposite ends of the beam 43 are entered telescopically into sleeves 44 of the square cross-section which sleeves 44 project towards one another from the inner plates 29 of the two pairs of those plates. In addition, the tubular beam 25 of circular cross-section is replaced by a beam 46 of square cross-section and the leading ends of the two beams 26 co-operate with said beam 46 by way of square holes alongside which are located square cross-section sleeves 45 furnished with transverse locking pins 47 that can be entered through chosen ones in rows of transverse holes 48 formed through the beam 46. A coupling assembly 42 is thus provided whose lower horizontally spaced apart coupling points (the hooks 33) can be located at any chosen one of a plurality of different distances from one another for co-operation with the three-point coupling members of various implements such as seed drills, fertiliser distributors and so on.

FIG. 1 of the drawings shows a seed drill 49 of broad working width connected to the rear of the soil cultivating implement, the broad working width of the seed drill 49 being the same as, and registering with, that of the soil cultivating implement to which it is connected. The front of the seed drill 49 with respect to the direction A is provided with a three-point coupling member and, as can be seen in FIG. 1 of the drawings, that three-point coupling member is connected to the coupling assembly 41 and could, of course, equally well be connected to the coupling assembly 42 that is illustrated in FIG. 4. The seed drill 49 has its own ground wheels 50 by which it is sustained from the ground surface during operation, the drill 49 being able to move upwardly and downwardly to match any undulations in the soil surface that may be met with, independently of the soil cultivating implement, by virtue of the upward and downward pivotability of the coupling means which comprises the coupling assembly 41 or 42 and the support 23 about the axis defined by the pivot pins 22 relative to the supporting frame 6 of the cultivating implement. The soil cultivating implement is itself pivotable upwardly and downwardly relative to the agricultural tractor or other vehicle which moves and operates it because of the pivotable arrangement of the strips 16 that afford the lower coupling points of its coupling member or trestle 15. Both the soil cultivating implement and the seed drill 49 can be transported in an inoperative position in which they are raised clear of contact with the ground. To achieve this, the three-point lifting device or hitch of the agricultural tractor or other operating vehicle to which the coupling member or trestle 15 is connected is raised at which time the beams 24 of the support 23 turn downwardly about the axis defined by the pivot pins 22 until, as shown in FIG. 2 of the drawings, they come to rest against the top of the rear beam 7 of the supporting frame 6. Up to this instant during raising of the three-point lifting device or hitch of the tractor or other vehicle, the leading soil cultivating implement alone is elevated whereafter the seed drill 49 also starts to rise away from the ground surface, being elevated by the coupling assembly 41 or 42 to which it is connected. If the seed drill 49 or other attached implement is a very heavy implement, then the soil cultivating implement may be provided with supports 51 as are shown diagrammatically in broken lines in FIG. 1 of the drawings. The rearmost end of each support 51 has a corresponding arm 54 turnably connected to it by a horizontal pivot pin or stub shaft that extends transverse to the direction A, the rearmost end of each arm 54 being connected to the mounting of a corresponding castor ground wheel 53 that is located behind the seed drill 49 or other implement with respect to the direction A. The supports 51 are provided with hydraulic piston and cylinder assemblies (not illustrated), said assemblies being connected to the arms 54 in such a way as to be able to turn those arms 54 positively downwardly about the pivot pins or stub shafts 52 when elevation to an inoperative transport position is required. The hydraulic piston and cylinder assemblies are coupled to the hydraulic system of the agricultural tractor or other vehicle that moves the two interconnected implements and operates at least the leading soil cultivating implement and this arrangement this is diagrammatically illustrated in broken lines in FIG. 1 enables both implements to be lifted well clear of the ground without exerting an undue strain upon the lifting device or hitch of the tractor or other operating vehicle. The soil cultivating implement that has been described has a large working width of substantially 4 meters and this broad implement can have a second agricultural implement of similarly broad working width, such as the diagrammatically illustrated seed drill 49, connected to it for concurrent operation. When inoperative transport of both implements is required, the second or trailing implement is adequately and safely supported from the frame 6 of the first or leading implement by way of the coupling means which includes the support 23 and the coupling assembly 41 or 42.

Although this invention has been described in relation to an agricultural implement in the form of a soil cultivating implement having a row of rotary soil working or cultivating members, it will readily be apparent that all or most of the features of the invention are equally applicable to other agricultural implements that are not necessarily soil cultivating implements.

Although various features of the agricultural implement that has been described and that is illustrated in the accompanying drawings will be set forth in the following claims as inventive features, it is emphasised that the invention is not necessarily limited to those features and that it includes within its scope each of the parts of each embodiment of the agricultural implement that has been described, and/or that is illustrated in the accompanying drawings, both individually and in various combinations.

What we claim is:

1. A rotary harrow having a row of rotatable soil working members on a frame and drive means connected to rotate said soil working members about upwardly extending axes defined by upwardly extending shafts journalled in an elongated portion of the frame, said frame including a forward beam spaced apart from a rear beam and these two beams being substantially horizontal, said forward beam having coupling means for connection to a prime mover and a coupling assembly positioned to the rear of said elongated frame portion, said assembly comprising two spaced apart coupling points and a third coupling point that is positioned between the two coupling points when viewed in plan, the two coupling points and said third point being mounted on common support means, said support means forming part of said assembly, said assembly being interconnected by beam members to said forward beam by pivots which define an axis about which the assembly is pivotable and said axis extending transverse to the direction of travel of the implement, said beam members extending generally parallel to the direction of travel and positioned above said rear beam, said members bearing on the rear beam which limits the downward pivotal movements of said assembly about said pivots during operation and transport.

2. An implement as claimed in claim 1, wherein said two horizontal beams are interconnected by a plurality of supporting beams to afford a supporting frame that overlies said frame portion.

3. An implement as claimed in claim 2, wherein there are two beam members that extend parallel to the direction of travel and to one another.

4. An implement as claimed in claim 3, wherein said two beam members are interconnected by a transverse beam and rearwardly extending further beams of said coupling assembly are also connected to the transverse beam.

5. An implement as claimed in claim 4, wherein a lower portion of said assembly comprises two spaced apart coupling points and the upper portion of said assembly comprises a third coupling point that is positioned between said two coupling points when viewed in plan.

6. An implement as claimed in claim 5, wherein said two lower coupling points are hooks provided with a spring-loaded retaining bolt.

7. An implement as claimed in claim 6, wherein said hooks are mounted on brackets that are vertically adjustable relative to said further beams.

8. An implement as claimed in claim 4, wherein said assembly can be fixed in any chosen one of a plurality of different vertical positions relative to said frame by adjusting means.

9. An implement as claimed in claim 8, wherein two pairs of plates on each of said further beams are horizontally fixable in any chosen one of a plurality of positions relative to said beam members by fastenings.

10. An implement as claimed in claim 9, wherein said transverse beam interconnects one plate of each pair, said transverse beam being located at substantially the center of said assembly and the third coupling point being fixed to that beam.

11. An implement as claimed in claim 4, wherein said further beams are connected together by said transverse beam and the lateral spacing between the further beams can be adjusted by an adjusting structure.

12. An implement as claimed in claim 11, wherein said transverse beam is telescopically received in sleeves mounted on plates connected to said further beams.

13. An implement as claimed in claim 12, wherein each spring-loaded retaining bolt has a control arm that is operable to move said bolt to an inoperative position, securing means holding each control arm and maintaining the corresponding bolt inoperative.

14. An implement as claimed in claim 13, wherein said securing means is a spring-loaded locking pin.

15. A rotary harrow having a row of rotatable soil working members supporting on a frame and drive means connected to rotate said soil working members about upwardly extending axes defined by upwardly extending shafts journalled in an elongated portion of the frame, said frame including a forward beam spaced apart from a rear beam and these two beams being substantially horizontal, said forward beam having coupling means for connection to a prime mover and a coupling assembly positioned to the rear of said elongated frame portion, said assembly comprising further beams and two spaced apart coupling points on bracket means being adjustably mounted along the lengths of said further beams, a third coupling point also forming part of said assembly positioned between said two coupling points, when viewed in plan and said assembly being interconnected by substantially straight beam members to said forward beam by pivots, which define an axis about which said assembly is pivotable and said axis extending transverse to the direction of travel of the implement, said beam members and further beams extending generally parallel to the direction of travel and the former being positioned directly above said rear beam, said beam members bearing on the rear beam which limits the downward pivotal movements of said assembly about said pivots during operation and transport.

* * * * *